United States Patent
Berner et al.

(10) Patent No.: US 6,726,131 B2
(45) Date of Patent: Apr. 27, 2004

(54) ROTATABLE DISTRIBUTION PLATE FOR PARTICULATE MATERIAL

(75) Inventors: Douglas B. Berner, Norwalk, IA (US); John E. Thiel, Clive, IA (US)

(73) Assignee: All-State Industries, Inc., West Des Moines, IA (US)

( * ) Notice: Subject to any disclaimer, the term of this patent is extended or adjusted under 35 U.S.C. 154(b) by 229 days.

(21) Appl. No.: 10/072,744

(22) Filed: Feb. 7, 2002

(65) Prior Publication Data

US 2003/0146309 A1 Aug. 7, 2003

Related U.S. Application Data

(60) Provisional application No. 60/344,236, filed on Dec. 27, 2001.

(51) Int. Cl.[7] .............................................. A01C 17/00
(52) U.S. Cl. ...................... 239/681; 239/650; 239/687
(58) Field of Search ............................... 239/223, 224, 239/672, 679, 681, 682, 683, 684, 685, 686, 687, 688, 650

(56) References Cited

U.S. PATENT DOCUMENTS

| | | | | |
|---|---|---|---|---|
| 2,766,872 A | * | 10/1956 | Pillsbury | ..................... 239/681 |
| 4,725,005 A | * | 2/1988 | Wiegelmann | ................ 239/682 |
| 5,082,186 A | | 1/1992 | Bruns | |
| 5,722,591 A | * | 3/1998 | Folger | ......................... 239/681 |
| 6,209,808 B1 | | 4/2001 | Anderson | |
| 6,598,812 B1 | * | 7/2003 | Matousek et al. | ........... 239/682 |

FOREIGN PATENT DOCUMENTS

| | | |
|---|---|---|
| DE | 3819715 A1 * | 1/1989 |
| DE | 3928240 | 2/1991 |
| DE | 4100774 | 12/1991 |
| EP | 585637 | 9/1994 |

* cited by examiner

Primary Examiner—Robin O. Evans

(57) ABSTRACT

A distribution plate for particulate material comprises a circular horizontal plate comprised of nylon. Spaced radial slots are cut in the plate and extend completely therethrough. A substantially rectangular fin is placed in each slot and is radially positioned in the slot for slidable movement to interconnect with interlocking surfaces between the slot and the bottom edge of the fin. The slots extend from an inner position to an outer radial position short of the outer periphery of the plate.

12 Claims, 6 Drawing Sheets

ROTATABLE DISTRIBUTION PLATE FOR PARTICULATE MATERIAL

CROSS REFERENCE TO A RELATED APPLICATION

This application is based upon Applicants' Provisional Application Ser. No. 60/344,236 filed Dec. 27, 2001.

BACKGROUND OF THE INVENTION

A rotatable distribution plate for particulate material is conventionally used in many environments to scatter the particulate material over various terrain, including highways, golf courses, farm fields and other such terrain. Such distribution plates are commonly comprised of a circular horizontal plate that is rotated about its center. A plurality of upstanding fins are secured to the plate to intercept and scatter the particulate material as that material is deposited on the rotating plate. In the case of highway maintenance trucks which scatter sand and salt over the highway, the weight and configuration of the fins is not of great significance. However, with the distribution of seed, fertilizer or the like on farm land, golf courses, lawns, and even golf greens, the weight of the plate and its distribution characteristics becomes much more critical.

Many conventional distribution plates are made of metal. The abrasive action of the particulate material on the fins causes the fins to deteriorate and also causes sharp edges to appear making the fins a danger to those working with them. If the fin is rigidly or integrally formed with the plate, the fins cannot be replaced when they become abrasively worn, and this requires that both the plate and the fins be removed and replaced if the structure is unitary, or requires a difficult manual or mechanical process for removing the worn fins from the plate. In the case of highway maintenance trucks, an integral distribution plate comprised of cast urethane with integrally formed fins has long been used. These plates are very expensive because of the cost of urethane, and since the distribution plate is integrally molded, the fins are not detachable. Sometimes fins can be detached from a metal distribution plate, but the manipulation of corroded nuts and bolts is cumbersome and is even dangerous if the fins have worn sharp edges.

It is therefore a principal object of this invention to provide a lightweight plastic distribution plate for particulate material which has easily detachable and replaceable fins held in place by the centrifugal force resulting from the rotation of the plate.

A further object of this invention is to provide a particulate material distribution plate which is comprised of lightweight inexpensive plastic material with fins that can be easily placed in operating position and removed therefrom as the case may require.

These and other objects will be apparent to those skilled in the art.

BRIEF SUMMARY OF THE INVENTION

The distribution plate for particulate material of this invention comprises a circular horizontal plate comprised of nylon. Spaced radial slots are cut in the plate and extend completely therethrough. A substantially rectangular fin is placed in each slot and is radially positioned in the slot for slidable movement to interconnect with interlocking surfaces between the slot and the bottom edge of the fin. The slots extend from an inner position to an outer radial position short of the outer periphery of the plate.

BRIEF DESCRIPTION OF THE DRAWINGS AND PHOTOS

DESCRIPTION OF THE PREFERRED EMBODIMENTS

Figure 1:
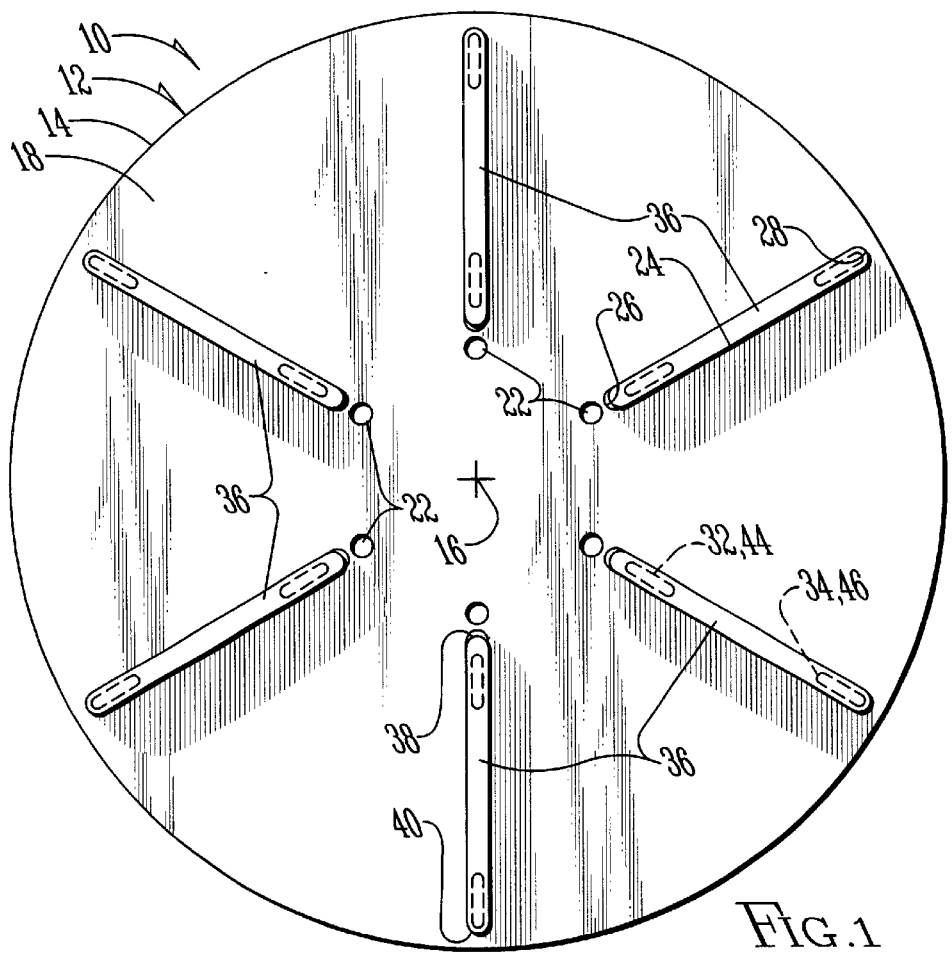
FIG. 1 is a top plan view of the spinner plate.
Figure 2:
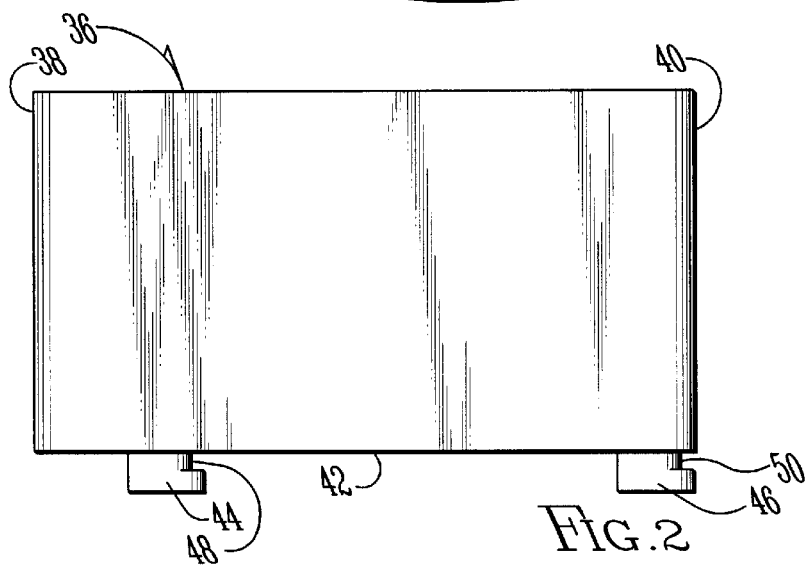
FIG. 2 is a side elevation of a spinner plate fin.
Figure 3:
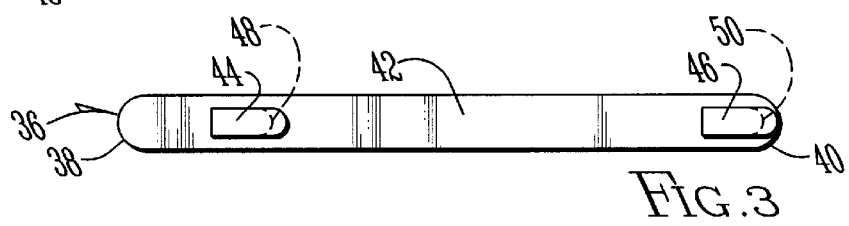
FIG. 3 is a bottom plan view of the spinner plate fin.

The numeral 10 designates a spinner assembly which is comprised of a spinner plate 12 having an outer periphery 14 and a center 16. The plate 12 has a top surface 18 and a bottom surface 20. A plurality of mounting holes 22 extend through the plate at a short radial distance from the center 16 to permit the mounting of the plate to a source of rotational power.

Figure 4:
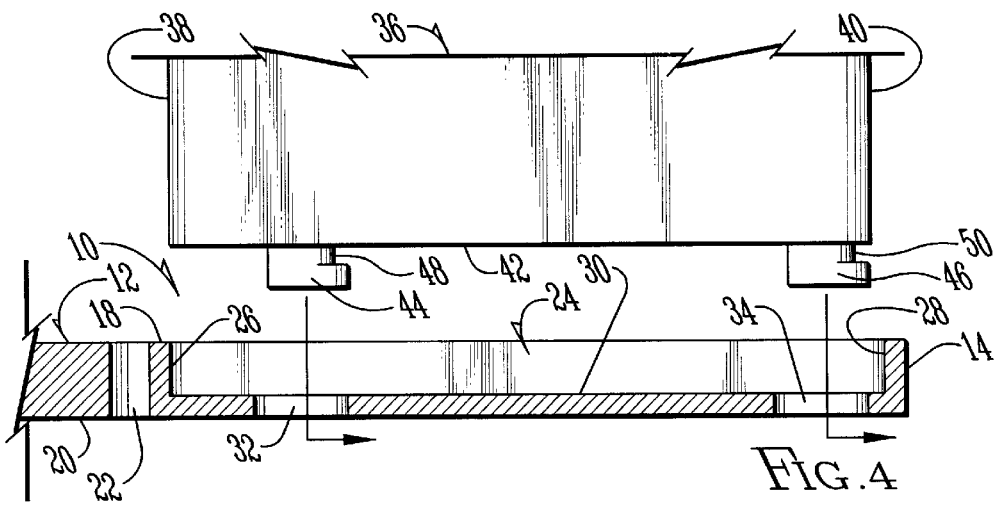
FIG. 4 is an enlarged scale partial sectional exploded view through the spinner plate showing a fin in a detached condition.
Figure 5:
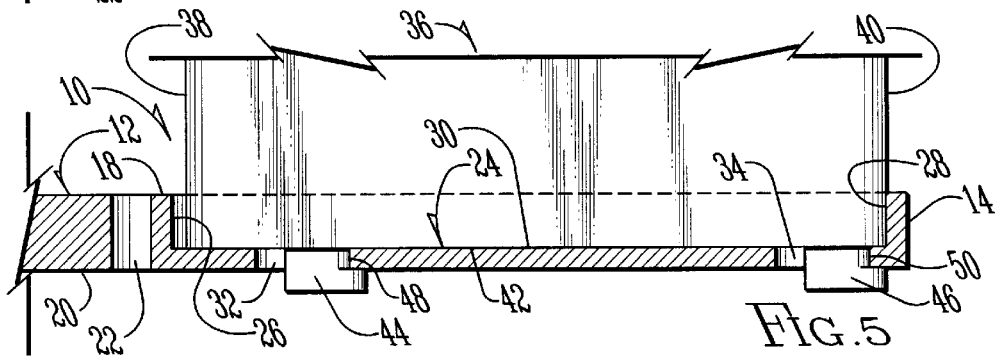
FIG. 5 is an assembled view of the components of FIG. 4.
Figure 6:
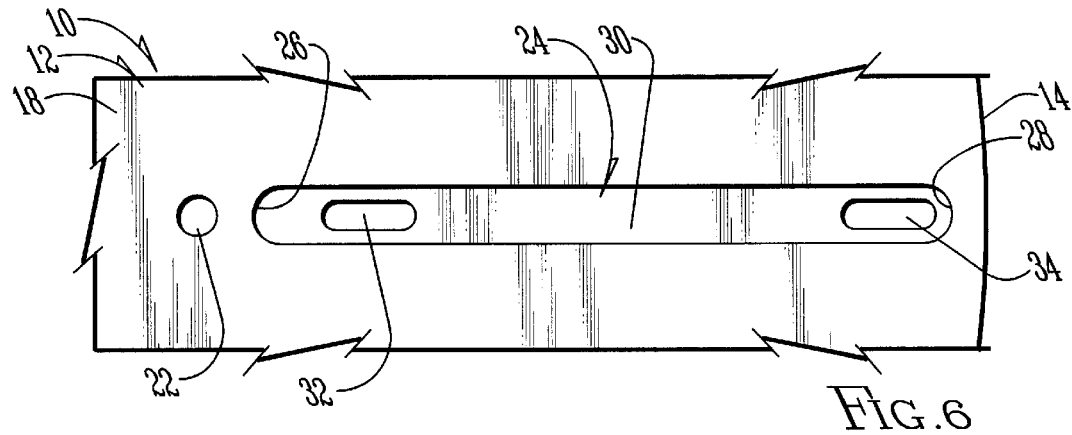
FIG. 6 is an enlarged scale partial plan view of a radial slot.
Figure 7:
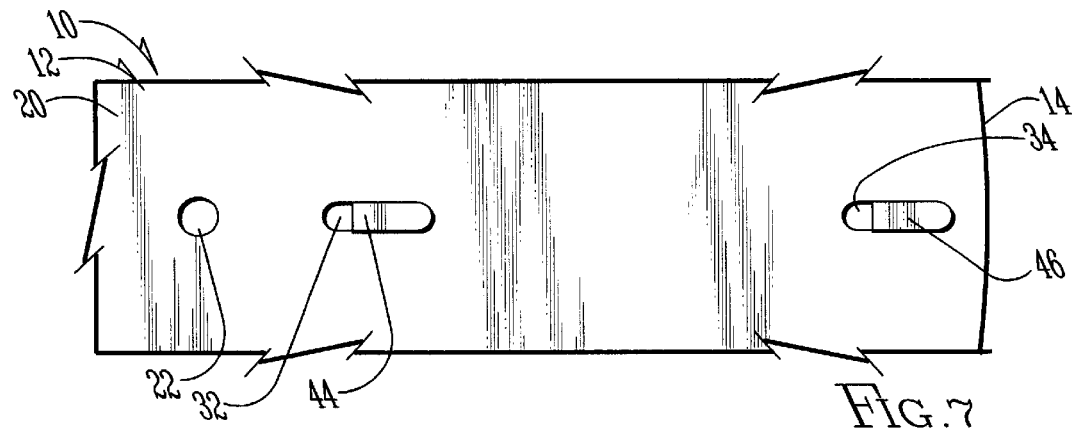
FIG. 7 is a bottom plan view of FIG. 3.
Figure 8:
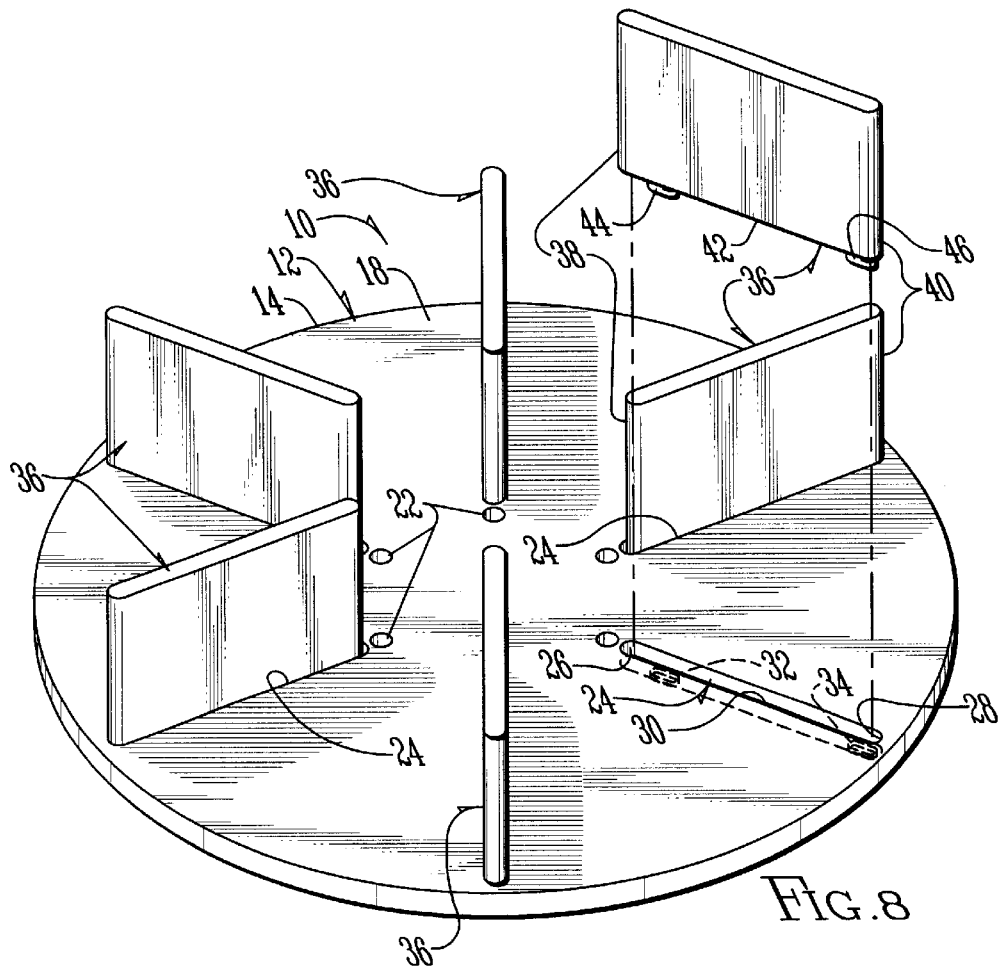
FIG. 8 is a perspective view of the spinner assembly with one fin removed.
Figure 9:
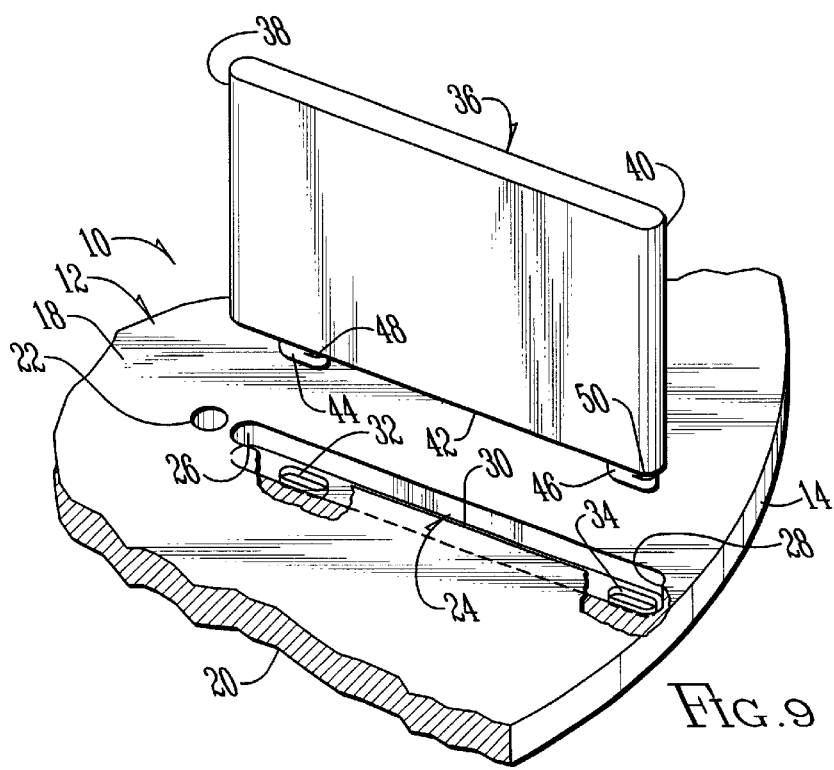
FIG. 9 is a more detailed perspective view showing a detached fin adjacent a slot in the spinner plate.
Figure 10:
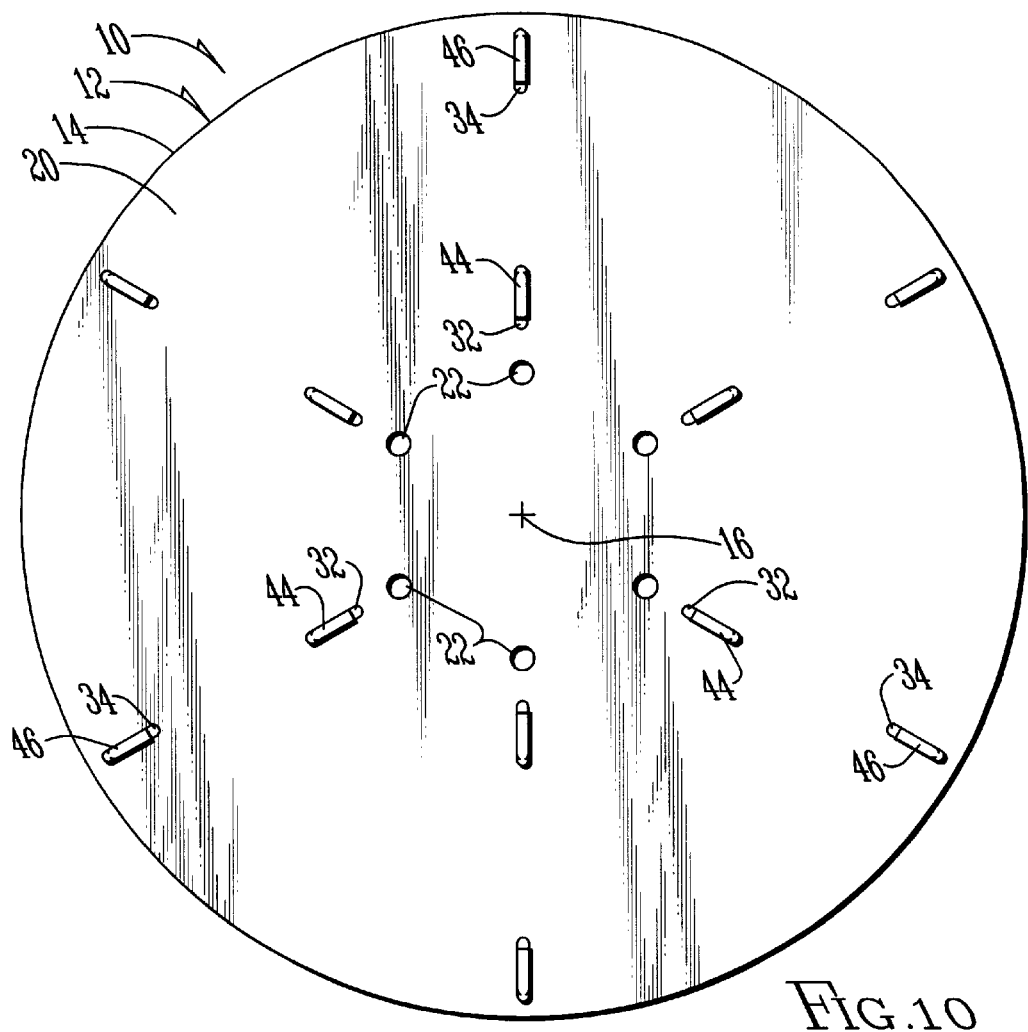
FIG. 10 is a bottom plan view of the spinner plate with fins in place.

A plurality of radial slots 24, preferably six in number, have an inner end 26 and an outer end 28. (FIGS. 4–6). Each slot has a bottom horizontal shelf 30 in which is located two separate elongated sub-slots 32 and 34.

A separate rectangular shaped fin 36 is removably located in each of the radial slots 24. (FIGS. 2–6). The fins 38 have an inner end 38 and an outer end 40. The numeral 42 designates the bottom edge of each fin which has two separate tabs 44 and 46 in spaced condition extending vertically downwardly therefrom. The tabs 44 and 46 each have notches 48 and 50 formed therein to create an interlocking condition with the shelf 30 as will be described hereafter.

It should be noted that the radial length of the sub-slots 32 and 34 is slightly greater than the radial length of the tabs 44 and 46 so that when the tabs are inserted into and through the sub-slots 32 and 34, the fin is permitted some slight longitudinal sliding movement in a radially outward direction within the slots 24. It should also be noted that the vertical height of the notches 48 and 50 is substantially equal to the vertical thickness of the shelf 30.

To assemble the fins 36 in the radial slots 24, the bottom portion of the fin is vertically moved into each slot so that the bottom surface 42 of the fin rests on the upper surface of the shelf. In order for this to take place, each tab 44 and 46 must penetrate and move completely through the openings 32 and 34 so that the bottom of each tab is located below the bottom surface 20 of the plate 12. (See FIG. 5).

The fin is then slidably moved outwardly within the slot 24 so that the notches 48 and 50 receive the outer ends of the sub-slots 32 and 34, respectively, to interlock the fin with the plate 12. With reference to FIG. 5, it is seen that the interlocking condition of the tabs 44 and 46 with the outer ends of the sub-slots 32 and 34 prevent the fin from moving any further outwardly on the plate and also prevent the fins from being lifted or moved upwardly with respect to the plate. The centrifugal force exerted on the fins as the plate is rotated maximizes the interlocking condition described above.

Figure 11:
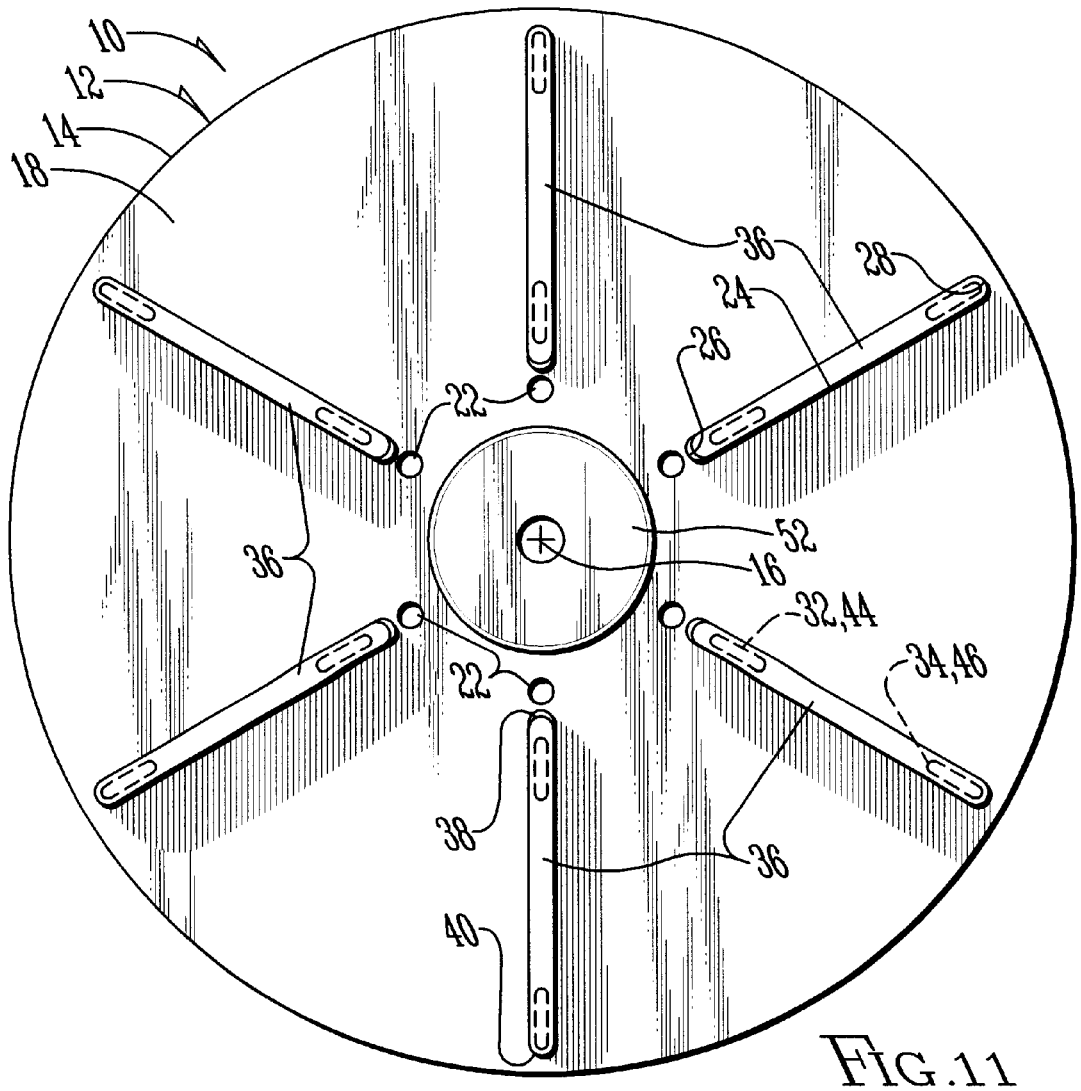
FIG. 11 is a top plan view of an alternate form of spinner plate.
Figure 12:
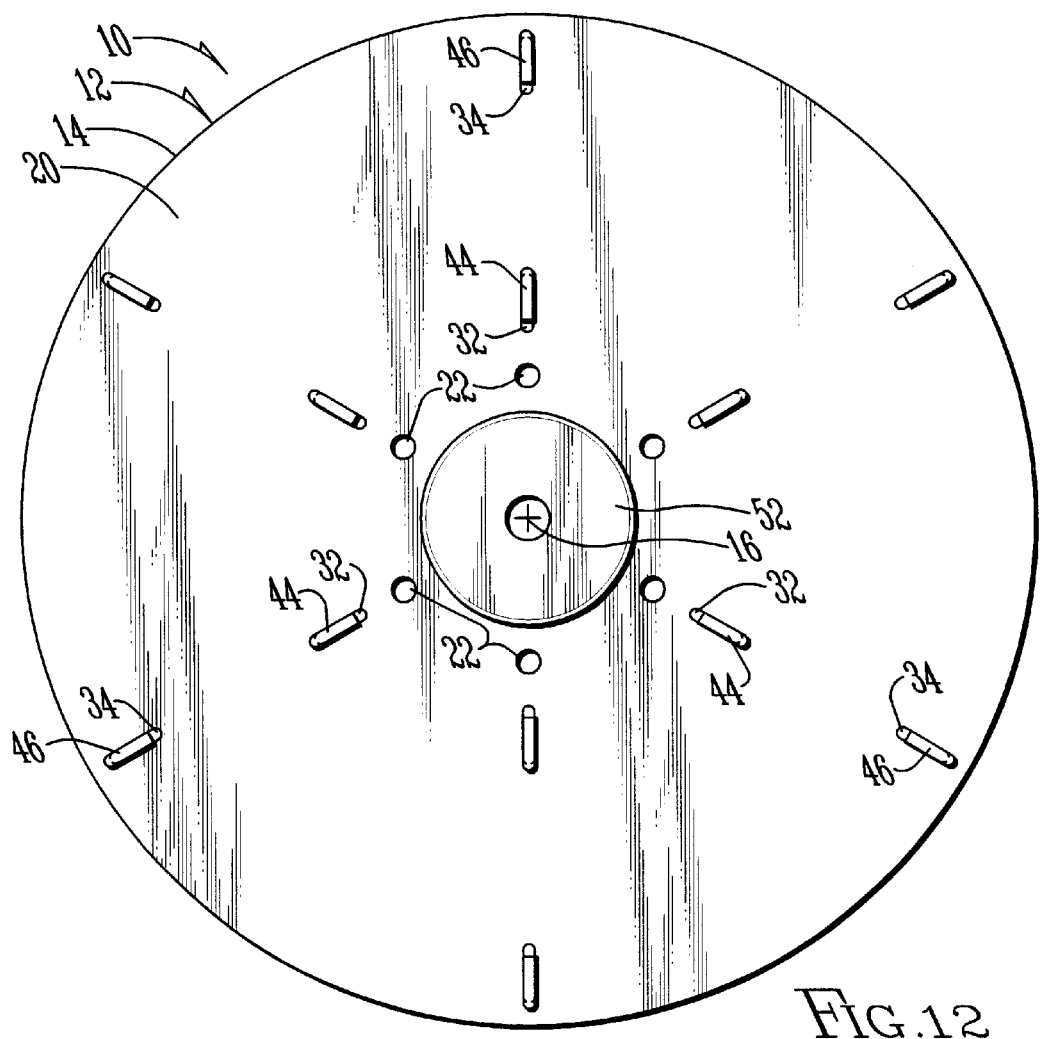
FIG. 12 is a bottom plan view of the spinner plate of FIG. 11.

A slightly modified variation of the foregoing structure is shown in FIGS. 11 and 12 wherein a circular metal insert 52 is frictionally forced into a center bore in the plate 12 and is rigid with the plate. This insert 52 can have a bore created in the center thereof to frictionally or otherwise receive a vertical rotational power shaft in the event that the rotating force applied to the plate calls for a direct connection between the plate and a vertical power shaft. It is preferred that the plate 12 be comprised of nylon plastic because nylon is strong, will not warp, and is stress relieved. The fins are comprised of polyethylene which is very wear resistant and is economical and substantially lightweight.

It is therefore seen that this invention will accomplish at least all of its stated objectives.

What is claimed is:

1. A rotatable plate for distribution of particulate material comprising, a circular horizontal plate having a center and an outer peripheral edge and being adapted to be rotated in a horizontal plane about its center, a plurality of spaced radial slots in the plate and extending from an inner end radially outward to an outer end which is located in spaced condition to the outer periphery of the plate, a vertical substantially rectangular fin having a lower edge slidably inserted into each of the slots and having a radial length less than the slots to permit sliding movement therebetween in a radial direction, interlocking surfaces on the plate and on the lower edge of the fin to permit the fin to be locked within the slot when the fin is moved to its maximum outer position within the slot whereby rotational motion of the plate will cause the fins to be retained in its locked position within the slot.

2. The device of claim 1 wherein the slots have a bottom horizontal shelf coextensive therewith, and at least one radial sub-slot therein, and each fin has a tab that extends into the sub-slot to limit outward radial movement of the fin within the slot.

3. The device of claim 2 wherein the tab and the sub-slot have interlocking surfaces to prevent upward movement of the fin out of the slot.

4. The device of claim 2 wherein the fin is slidably mounted for limited radial movement in the sub-slot as the fin is moved into an interlocking condition in the slot and the sub-slot.

5. The device of claim 1 wherein two sub-slots are in the slot to receive one each of two spaced tabs on the fin.

6. The device of claim 1 wherein there are six equally spaced radial slots in the plate.

7. The device of claim 1 wherein the plate is comprised of nylon.

8. The device of claim 1 wherein the fins are comprised of polyethylene.

9. The device of claim 1 wherein the plate is comprised of nylon and the fins are comprised of polyethylene.

10. The device of claim 1 wherein a metal insert is located at the center of the plate to permit the boring of an aperture for the reception of a vertical drive shaft.

11. The device of claim 4 wherein the tabs extend through the sub-slots, and a notch in the tabs receives a portion of the shelf at an outward end of the sub-slot to prevent the further outward movement and upper movement of the fin with respect to the plate.

12. The device of claim 11 wherein the tabs extend through the sub-slots and terminate at a level below a bottom surface of the plate.

* * * * *